(12) United States Patent
Tamura

(10) Patent No.: US 6,858,364 B2
(45) Date of Patent: Feb. 22, 2005

(54) ELECTROPHOTOGRAPHIC PHOTORECEPTORS

(75) Inventor: Shinichi Tamura, Tokyo (JP)

(73) Assignees: Daewon Scn. Co., Ltd. (KR); Samsung Electronics Co., Ltd. (KR)

( * ) Notice: Subject to any disclaimer, the term of this patent is extended or adjusted under 35 U.S.C. 154(b) by 0 days.

(21) Appl. No.: 10/682,948

(22) Filed: Oct. 10, 2003

(65) Prior Publication Data

US 2004/0076898 A1 Apr. 22, 2004

Related U.S. Application Data

(62) Division of application No. 10/169,296, filed as application No. PCT/JP00/09208 on Dec. 25, 2000.

(30) Foreign Application Priority Data

Dec. 31, 1999 (JP) .......................................... 11-377403
Jan. 16, 2000 (JP) ........................................ 2000-43482

(51) Int. Cl.⁷ ............................................. G03G 15/04
(52) U.S. Cl. ...................... 430/78; 430/59.4; 430/59.5
(58) Field of Search ........................ 430/78, 59.4, 59.5

(56) References Cited

U.S. PATENT DOCUMENTS

| | | | |
|---|---|---|---|
| 2,297,691 A | | 10/1942 | Carlson |
| 2,799,595 A | | 7/1957 | Kudzin |
| 2,861,005 A | | 11/1958 | Siegel |
| 3,357,989 A | | 12/1967 | Byrne et al. |
| 5,721,080 A | * | 2/1998 | Terrell et al. .................. 430/78 |
| 5,773,181 A | * | 6/1998 | Molaire et al. ............... 430/78 |
| 2002/0007056 A1 | * | 1/2002 | Shimada et al. ............ 540/124 |

FOREIGN PATENT DOCUMENTS

| | | |
|---|---|---|
| EP | 401782 | 12/1990 |
| EP | 0687133 A2 | 12/1995 |
| EP | 798346 | 10/1997 |
| EP | 1004634 | 5/2000 |
| JP | 39-16787 | 5/1972 |
| JP | 47-10831 | 5/1972 |
| JP | 58-182639 | 10/1983 |
| JP | 60-243089 | 12/1985 |
| JP | 61-109056 | 5/1986 |
| JP | 62-194257 | 8/1987 |
| JP | 63-366 | 1/1988 |
| JP | 63-198067 | 8/1988 |
| JP | 64-17066 | 1/1989 |
| JP | 1-123868 | 5/1989 |
| JP | 2-233769 | 9/1990 |
| JP | 04106159 A | * 4/1992 ........... C09B/47/04 |
| JP | 4-106519 | 4/1992 |
| JP | 04-184452 | 7/1992 |
| JP | 4-184454 | 7/1992 |
| JP | 5-2278 | 1/1993 |
| JP | 50-21027 | 1/1993 |
| JP | 4-184449 | 8/1993 |
| JP | 5-346672 | 12/1993 |
| JP | 60-87332 | 3/1994 |
| JP | 60-95441 | 4/1994 |
| JP | 61-23924 | 5/1994 |
| JP | 6-234937 | 8/1994 |
| JP | 62-47054 | 9/1994 |
| JP | 62-67094 | 9/1994 |
| JP | 6-279448 | 10/1994 |
| JP | 63-364 | 1/1998 |
| JP | 2000-212462 | 8/2000 |
| JP | 2000-284513 | 10/2000 |

OTHER PUBLICATIONS

Tomilova, L.G. et al. "The First Synthesis of Sandwich–type Titanium Bisphthalocyanines" *Mendeleev Commun* 1995, pp. 109–110, vol. 3.

Kroenke, W.J. et al. "A Series of Phthalocyaninotin Complexes" *Inorg. Chem.*, 1964, pp. 251–254, vol. 3, No. 2.

Silver, J. et al. "The Electrochromic Behaviour of Zirconium Diphthalocyanine and Molybedenum Phthalocyanine Oxide" Polyhedron 1989, pp. 1631–1635, vol. 8, No. 13/14.

* cited by examiner

*Primary Examiner*—Christopher Rodee
(74) *Attorney, Agent, or Firm*—Saliwanchik, Lloyd & Saliwanchik

(57) ABSTRACT

The subject application provides for a composition crystal comprising a phthalocyanine compound and an asymmetric phthalocyanine wherein a part of benzene ring in phthalocyanine structure is substituted with naphthalene ring, pyridine or pyrazine ring, is stable against crystal transfer such as agglomeration, precipitation, crystal growth, crystal habit transfer and crystal electric potential, and has good electric properties such as good sensitivity. When this composition crystal is used as a charge generation material in an electrophotographic receptor, the electrophotographic photoreceptor shows good sensitivity and good image quality without noise.

6 Claims, No Drawings

ELECTROPHOTOGRAPHIC PHOTORECEPTORS

FIELD OF THE INVENTION

The present invention relates to electrophotographic photoreceptors applied to copying machines, printers, etc.

BACKGROUND OF THE INVENTION

Electrophotography disclosed in U.S. Pat. No. 2,297,691 by Carlson, has been applied to copying machines, printers, etc. Especially, as information processing has been developing rapidly, photoprinters and digital photocopying machines applying electrophotogaphy with a light source of semiconductor laser or light-emitting diode, which is appropriate for digital processing, has become widespread. Accordingly, electrophotographic photoreceptors having a high sensitivity and a good reliability have been required.

So far, inorganic photoreceptors having a photoconductive layer comprising an inorganic photoconductive material such as selenium, zinc oxide, cadmium sulfide, was used as electrophotographic photoreceptors. However, these inorganic photoreceptors dose not satisfy properties such as photosensitivity, durability and safety. Lately, organic photoconductive materials have been actively searched for applying to electrophotography.

In these organic photoconductive materials, polyazo-based pigments, phthalocyanine-based pigments, azulenium salt-based pigments, pyrylium salt-based pigments and naphthoquinone-based pigments have sensitivity to a semiconductor laser light.

However, naphthoquinone-based pigments are disadvantageous in sensitivity and polyazo-based pigments are difficult to synthesize. Regarding azulenium salt-based and pyrylium salt-based pigments, their photoelectric properties are easily deteriorated by moist and their chemical structures are not stable against a strong light such as laser.

Phthalocyanine compounds are widely used as a blue pigment of inks and paints because they are chemically and physically stable. So, they are considered as a charge generating material of electrophotographic photoreceptors. Generally, light absorption spectrum and electric properties of phthalocyanine pigment depend on a kind of its central atom. However, though phthalocyanine compound have the same chemical structure, that is phthalocyanine compounds have the same central atom, the spectrum and electric properties can be varied according to crystal form, crystal habit and particle size.

Till now, many phthalocyanine compounds such as copper phthalocyanine, metal-free phthalocyanine, chloroaluminium phthalocyanine, chloroindium phthalocyanine, chlorogallium phthalocyanine, chlorogermanium phthalocyanine, vanadyloxy phthalocyanine, titanyloxy phthalocyanine, hydroygermanium phthalocyanine, hydroxygallium phthalocyanine, etc. have been proposed as a charge generation material. In these phthalocyanine compounds, phthalocyanine-based charge generation materials having different crystal form include copper phthalocyanine such as ε type copper phthalocyanine, and metal-free phthalocyanine such as X type metal-free phthalocyanine (U.S. Pat. No. 3,357,989), τ type metal-free phthalocyanine (Japanese Patent Application Laying-open No. 62-47054), τ' type metal-free phthalocyanine (Japanese Patent Application Laying-open No. 60-87332), X type metal-free phthalocyanine (Japanese Patent Application Laying-open No. 60-243089), metal-free phthalocyanine (Japanese Patent Application Laying-open No. 58-182639) and metal-free phthalocyanine (Japanese Patent Application Laying-open No. 2-233769). Titanyl phthalocyanines having different crystal form include α type crystal (Japanese Patent Application Laying-open No. 61-23924), Y type crystal (Japanese Patent Application Laying-open No. 1-17066), I type crystal (Japanese Patent Application Laying-open No. 61-109056), A type crystal (Japanese Patent Application Laying-open No. 62-67094) and C type crystal (Japanese Patent Application Laying-open Nos. 63-364 and 63-366). Otherwise, B type crystal (Japanese Patent Application Laying-open No. 61-23924), m type crystal (Japanese Patent Application Laying-open No. 63-198067) and semi-amorphous type crystal (Japanese Patent Application Laying-open No. 1-123868) were proposed.

As a charge generation materials comprising at least 2 kind of phthalocyanine, a mixture of titanyl phthalocyanine and metal-free phthalocyanine (Japanese Patent Application Laying-open No. 62-194257), X type metal-free phthalocyanine composition crystal comprising titanyl oxy phthalocyanine and metal-free phthalocyanine (Japanese Patent Application Laying-open No. 2-2702067), a composition crystal comprising titanyl phthalocyanine and vanadyl phthalocyanine (Japanese Patent Application Laying-open No. 5-2278), a mixed crystal comprising halogenized potassium phthalocyanine and metal-free phthalocyanine (Japanese Patent Application Laying-open No. 6-234937) and a phthalocyanine composition comprising titanyl phthalocyanine and a halogenized metal phthalocyanine having a trivalent central metal were proposed.

When these phthalocyanine-based charge generation materials are produced, they are roughly agglomerated crystals having a size more than several ten microns. So, they are dispersed in a solvent for atomization and then the dispersed liquid are coated on a photoreceptor substrate. If the particles of dispersed charge generation material become larger due to crystal electric potential, crystal growth, and agglomeration, electrophotographic properties are deteriorated and partial ununiformities of electrical properties during coating process happen. Also, images defects such as black dots and white streaks happen. Accordingly, a charge generation material is required to be stable against crystal transfer, crystal growth, and agglomeration.

However, phthalocyanine-based charge generation materials known to the art have not solved these problems. Y type titanyl phthalocyanine having a highest peak at Bragg diffraction angle (2θ) of 27.3 degree in X ray diffraction spectrum has excellent sensitivity, and thus various crystal forms having different crystal habit have been proposed. However, these crystals are included in II type crystal, which is not stable against solvents as disclosed in Japanese Patent Application Laying-open 62-670094. Accordingly, properties and qualities of the photoreceptor become problematic according to aging. Also, producing cost is expensive due to a bad storing stability.

In the art related to inks and paints, phthalocyanine derivatives have been used to prevent crystal transfer, crystal growth and agglomeration of phthalocyanine pigments. Concretely, copper phthalocyanine having aminomethyl group (Japanese Patent publication No. 39-16787, Japanese Patent Application Laying-open Nos. 47-10831 and 50-21027), sulfonated copper phthalocyanine (U.S. Pat. No. 2,799,595) and copper phthalocyanine having sulfone amide group (U.S. Pat. No. 2,861,005) were proposed. However, these phthalocyanine derivatives cannot be used because they deteriorate electrical properties such as sensitivity and maintenance of electric potential.

In conclusion, though the proposed phthalocyanine-based charge generation materials have a good sensitivity right after dispersed in a solvent, they are not stable in a solvent and their properties become deteriorated according to aging. So, there is needed to develop a controlling agent for preventing crystal transfer in coating solution, a dispersion stabilizer for preventing agglomeration, or a charge generation material having stability against crystallization and agglomeration.

The present invention provides a controlling agent for stabilizing phthalocyanine having a good sensitivity in a solution, and a charge generation material having a good dispersability and stability against crystallization and agglomeration.

Moreover, the present invention provides an electrophotographic photoreceptor having a good sensitivity, electric potential maintenance and image properties.

DETAILED DESCRIPTION OF THE INVENTION

The inventor noted that sandwich-type metal bisphthalocyanine compounds control crystal electric potential, crystal growth and agglomeration of a phthalocyanine-based charge generation material in a coating solution without deteriorating electrophotographic properties such as sensitivity. Moreover, a composition crystal of metal bisphthalocyanine compound and phthalocyanine compound is very stable against crystal transfer such as agglomeration, precipitation, crystal growth, crystal habit deformation and crystal electric potential, and has good electric properties such as sensitivity. When this composition crystal is used as a charge generation material in an electrophotographic photoreceptor, the electrophotographic photoreceptor shows a good sensitivity and a good image quality without noise.

A sandwich-type metal bisphthalocaynine compound related to one aspect of the present invention has a structure wherein a tetravalent metal is bonded to 2 phthalocyanines. It is represented by the general formula (I):

$$Pc=M_1=Pc \quad (I)$$

$$M_2=Pc \quad (II)$$

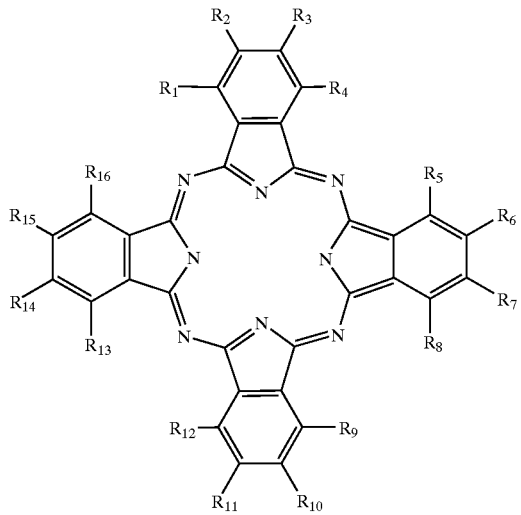

wherein Pc is a phthalocyanine residue of the general formula (III);

$R_1$~$R_{16}$ are each a hydrogen atom, a halogen atom, a nitro group, an alkyl group or an alkoxy group; and $M_1$ and $M_2$ each represent hydrogen or metal atom bonded to the center of a phthalocyanine residue, $M_1$ being an atom selected from the group consisting of Ti, Zr, Sn and Ge, and $M_2$ being an atom selected from the group consisting of hydrogen ($H_2$), Cu and Al, and Ti, V, Zr, Ge, Ga and In to which oxygen, halogen atom or hydroxyl group is bonded.

As a metal, IV group metal and lanthanides known to the art can be used. Preferably, titan and zirconium are used, because they are more stable and inexpensive. In addition, a mixture of the metals can be used.

When metal bisphthalocyanine compound is used in an electrophotographic photoreceptor, total thickness of the electrophotographic photoreceptor should be 5 microns or more for electric potential maintenance. In addition, charge generation layer stated below is generally 1 micron or less. Accordingly, it is inappropriate that particle size of materials used in a photoreceptor is over the thickness of layer. Moreover, it is required that a particle size in photosensitive layer is small for a uniformity of photosensitive layer. When metal bisphthalocyanine according the first aspect of the present invention is used in electrophotographic photoreceptor, the particle size of the metal bisphthalocyanine is to be less than thickness of layer. The primary particle size is preferably 1 micron or less, more preferably, 0.1 micron or less.

However, the synthesized metal bisphthalocyanine compound has irregular particle size and even there are particles having a diameter over several 10 microns. Accordingly, the synthesized metal bisphthalocyanine is grinded and crushed into particles having a diameter of 1 micron or less, more preferably, 0.1 micron.

As metal bisphthalocyanine compound should be mixed uniformly to effectively act as a phthalocyanine-based charge generation material, a charge generation material made as a form of uniform composition prior to applying to a photosensitive layer. However, a metal bisphthalocyanine of the present invention can be added as an additive in the time of dispersing phthalocyanine-based charge generation material.

In the composition according to the first aspect of the present invention, a ratio of metal bisphthalocyanine is 100 weight parts or less, preferably 0.01~50 weight parts, more preferably 0.01~20 weight parts, per 100 weight parts of phthalocyanine-based charge generation material.

Phthalocyanine-based charge generation materials mixed in the composition of the present invention can be any of phthalocyanine-based charge generation material known to the art. However, a charge generation materials containing metal-free phthalocyanine or titanyl phthalocyanine is preferred as main components.

In addition to a composition, a composition crystal comprising metal bisphthalocyanine compound and phthalocyanine compound is proposed as a charge generation material. Herein, a composition crystal means not a simple mixture of plural crystals each comprising uniform chemical compound but a crystal wherein at least two kinds of chemical compound are assembled into a molecular level in primary particle. It can be easily know from various analyzing method whether it is a composition or a composition crystal.

For example, X ray diffraction spectrum, infrared absorption spectrum and visible absorption spectrum show new diffractive angle and absorption peak in composition crystal. Though the spectrums are not changed, a mixture of crystals which are treated in the same manner and mixed in the same ratio with the crystal composition has different diffraction and absorption intensities and intensity ratio in the spectrums due to their different crystal habit, crystal face and growth degree.

To produce a composition crystal of metal bisphthalocyanine compound and phthalocyanine compound, metal bisphthalocyanine compound and phthalocyanine compound according to the first aspect of the present invention, should be mixed into molecular level. The mixing method can be a chemical method such as acid pasting method or acid slurry method wherein metal bisphthalocyanine compound and phthalocyanine compound are solved in a heavy acid such as sulfuric acid into molecular level and then the solution is added to a supplementary solvent such as water with alcohol. The second method is a physical method wherein two kinds of molecule are physically assembled into an identical crystal through abrasion and grinding. In this mechanical method, each crystal is ground and scattered into amorphous form.

A composition crystal that is mixed into molecule level according to the above-mentioned method can be used as a charge generation material without treatment. However, it can be transferred to other crystal form by a method known to the art. When transferring crystal form, the efficiency can be raised by treating the composition crystal in a temperature 10° C. higher than a treating temperature of composition without metal bisphthalocyanine or by adding a crystal having a proposed crystal form as an inducing agent.

In the composition crystal of the present invention, a ratio of metal bisphthalocyanine compound to phthalocyanine-based compound is 100 weight parts or less, preferably 0.01~50 weight parts, more preferably 0.01~20 weight parts, per 100 parts of phthalocyanine-based compound.

A grinding apparatus used in crystallization and transfer includes an attriter, a ball mill, a sand mill, a high-speed mixer, a Banbury mixer, a spec mixer, a roll mill, a three-roll mill, an nanomizer, a stumble mill, an epicyclical mill, a vibration mill and a kneader. Dispersing media such as glass beads, steel beads, zirconia beads, alumina balls, zirconia balls and flint stones may be additionally employed, if necessary. Dispersing auxiliary such as salt, glauber salt, and sodium carbonate may be added, if necessary.

A method for synthesizing preparing metal bisphthalocyanine compound used in the first aspect of the present invention is as follows:

a) heating metal-free phthalocyanine and tetravalent halogenized metal salt in a solvent under the existence of an alkali metal salt (L. G. Tomilova and K. M. Dyumaev, Mendeleev Commun. (1995), [3], 109–110);

b) heating dialkalimetal phthalocyanine and dihalogenized metal phthalocyanine in a solvent (W. J. Kroenke and M. E. Kenney, Inorg. Chem., 1964, 3 (2), 251); and c) heating diaminoisoindoline and tetravalent halogenized metal salt in a solvent under nitrogen atmosphere (J. Silver, P. J. Lukes, P. K. Hey and J. M. OConnor, Polyhedron, 1989, Vol8, 1631–1635).

In addition, other method such as synthesizing titanyl bisphthalocyanine by using an appropriate dechlorinating agent in the process of preparing titanyl bisphthalocyanine from metal-free phthalocyanine.

A method for preparing phthalocyanine compound used in the first aspect of the present invention is disclosed in [Phthalocyanine Compounds](1963) by F. H. Moser and A. L. Thomas. According to this method, titanyl oxyphthalocyanine, for example, is produced by condensation reaction of phthalodinitrile and titanium tetrachloride or reaction of 1,3-diiminoisoindoline and tetraalkoxy titanium.

An organic solvent used in the reaction of metal bisphthalocyanine compound and phthalocyanine compound is preferably an inactive solvent having high boiling point such as α-chloronaphthalene, β-chloronaphthalene, α-methylnaphthalene, methoxynaphthalene, diphenylnaphthalene, ethylene glycol dialkyl ether, quinoline, sulfolane, dichlorobenzene, N-methyl-2-pyrrolidone, dichlorotoluene, etc.

Metal bisphthalocyanine and phthalocyanine compound synthesized according to the above mentioned method are purified using acid, alkali, acetone, methanol, ethanol, methylethylketone, tetrahydrofurane, pyridine, quinoline, sulfolane, α-chloronaphthalene, toluene, xylene, dioxane, chloroform, dichloroethane, N,N-dimethylform amide, N-methyl-2-pyrrolidone or water for electrophotographic application. The purification method includes, not limited, extrusion method such as washing method, recrystallization method and soxhlet method, heat suspension method, sublimation method, etc. However, any method through which unreactants and additional products are removed can be applied.

In the composition crystal, the used phthalocyanine compound can include any of phthalocyanines and their derivatives known to the art. Preferably, it can be at least one selected form the group consisting of metal-free phthalocyanine, titanyl oxy phthalocyanine, vanadyl oxy phthalocyanine, copper phthalocyanine, chloroaluminum phthalocyanine, chlorogallium phthalocyanine, chloroindium phthalocyanine, dichlorogermanium phthalocyanine, hydroxyaluminum phthalocyanine, hydroxygallium phthalocyanine, hydroxyindium phthalocyanine and dihydroxygermanium phthalocyanine.

The photoreceptor according to the present invention can be formed by laminating a charge generation layer and a charge transport layer on a conductive substrate for effective charge generation and charge transport or by forming a charge generation transport layer in which charge generation and charge transport are done together. In the case of the multi-layered type photoreceptor, the charge generation layer is prepared by dispersing a charge generation composition or composition crystal according to the present invention in a solvent with an appropriate resin, coating the dispersed solution on a conductive substrate, and then drying.

The content of a charge generation material in a charge generation layer is 10~80 wt %, preferably 30~70 wt %. The thickness of a charge generation layer is 0.001~10 μm, preferably, 0.05~2 μm. When the thickness of a charge generation layer is below 0.001 μm, it cannot be formed uniformly. On the contrary, when over 10 μm, electrophotographic properties are deteriorated.

On a charge generation layer, a charge transport layer comprising charge transport material is coated. If the charge transport material can be coated by itself, a charge transport layer can be formed by using only charge generation material. Otherwise, a charge generation material is solved in a liquid with a resin having coatibility and the coating liquid is coated on a charge generation layer to form a charge transport layer. The thickness of layer can be adequately regulated according to the purpose of the electrophotographic photoreceptor but it is preferable to regulate from 5 to 50μ.

Charge transport material can be a hole transport material that transports holes or an electron transport material that transports electrons. When the multi-layered type photoreceptor is used in a negative-charging method, a hole transport material is used as a charge transport material. When it is used in a positive-charging method, an electron transport material is used. In addition, a mixture of a hole transport material and an electron transport can be used when there is needed both negative and positive characters.

In the case of a mono-layered photoreceptor, a charge transport materials, a composition or a composition crystal according to the present invention, and resin are solved in a solvent. The dispersed solution is coated on a conductive substrate and then dried to form a charge generation transport layer.

As phthalocyanine has photoconductivity and ability to transport charge, the use of an electron transport material is optional. When electron transport material is not used, the content of a composition or composition crystal according to the present invention in a charge generation transport layer is 3~40 wt %. However, a charge transport material known to the art is used to improve flexibility and charge transport efficiency. When a charge generation transport material is used, the content of a composition or composition crystal according to the present invention is 0.1~20 wt %, preferably 0.2~5 wt % and the content of resin is 20~70 wt %. A charge transport material used in a charge generation transport layer can be selected from the group consisting of hole transport materials, electron transport materials, and mixtures thereof. Preferably, a mixture of hole transport material and electron transport is used because both electron and charge are transported in a charge generation transport layer. The ratio of a hole transport material and an electron transport material is regulated according polarity and mobility of charge. The thickness of charge generation transport layer is preferably 5~50μ.

In addition to the charge generation composition or charge generation transport composition according to the present invention, dyes and pigments for regulating spectral sensitivity can be used jointly. As this materals, bisazo-based compounds, triazo-based compounds, antraquinone-based compounds, perylene-based compounds, perynone-based compounds, azulenium salt-based compounds, squarylium salt-based compounds, pyrrolopyrrole-based compounds, naphthalocyanines and phthalocyanines are represented.

The hole transport material used together with charge generation material according to the present invention includes oxadiazole-based compounds, styrene compounds, aryl amine compounds, oxazole-based compounds, pyrazolines, pyrazolone-based compounds, stilbene compounds, polyarylalkane-based compounds, polyvinylcarbazole and their derivatives, polymers of N-acrylamide methyl carbazole, quinoxaline polymer, vinyl polymer, triphenylmethane polymer, styrene copolymer, polyacenaphthene, polyindene, acenaphthylene-styrene copolymer and formaldehyde-based condensation resins.

In the photosensitive layers, an electron acceptor can be added for improvement of sensitivity and reduction of residual electric potential and fatigue damage. Useful electron acceptor compounds include compounds exhibiting a large electron affinity, such as succinic anhydride, maleic anhydride, dibromosuccinic anhydride, phthalic anhydride, 3-nitrophthalic anhydride, 4-nitrophthalic anhydride, pyromellitic anhydride, pyromellitic acid, trimellitic acid, trimellitic anhydride, phthalimide, 4-nitrophthalimide, tetracyanoethylene, teracyanoquinodimethane, chloranil, bromanil, o-nitrobenzoic acid, and p-nitrobenzoic acid. The ratio of organic receptor is 0.01~100 wt % to a carrier generation material.

Electron transport material used in the present invention includes benzoquinone-based compounds, naphthoquinone-based compounds, antraquinone-based compounds, malononitrile-based compounds, fluorene-based compounds, dicyanofluorene-based compounds, benzoquinone imide-based compound, diphenoquinone-based compounds, stilbenequinone-based compounds, diiminoquinone-based compounds, dioxotetracenedion compounds, and thiopyrrane compounds. In addition, any material with mobility faster than $10^{-8}$ cm$^2$/s can be used as a charge transport material that transports charge such as hole or electron in charge generation layer or charge generation transport layer. Also, a mixture of at least two charge transport materials can be used.

A resins used in forming charge generation layer, charge generation transport layer, or charge transport layer can be an dielectric resin or an organic photoconductive polymer having film forming character such as poly-N-vinylcarbazole and polyvinyl anthracene. Resins useful herein include poly(vinyl butyral), polyallylate (condensation polymer of bisphenol A and phthalic acid), polycarbonate, polyester, phenoxy resin, poly vinyl acetate, acrylic resin, polyacryl amide resin, polyamide, polyvinylpyridine, cellulose-based resin, urethane resin, epoxy resin, silicon resin, polystyrene, polyketone, polyvinyl chloride, vinyl chloride-vinyl acetate copolymer, polyvinyl acetal, poly acrylonitrile, phenol resin, melamine resin, casein, polyvinyl alcohol, and polyvinylpyrrolidone.

A solvent used in a coating liquid of charge generation layer, charge transport layer, or charge generation transport layer is selected according to resin. Preferred is a solvent which dose not affect neighbor layer. Solvents useful herein include benzoic hydrocarbons such as, benzene, xylene, ligroin, monochlorobenzene and dichlorobenzene; ketones such as acetone, methylethylketone and cyclohexanone; alcohols such as methanol, ethanol and isopropanol; esters such as ethyl acetate and methylcellosolve; aliphatic halogenized hydrocarbons such as carbon tetrachloride, chloroform, dichlormethane, dichlorethane and trichlorethylene; ethers such as tetrahydrofuran, dioxane, dioxolane and ethylene glycol monomethyl ether; amides such as N,N-dimethylformamide and N,N-dimethylacetamide; and sulfoxides such as dimethyl sulfoxide.

The instruments useful for dispersing or for dissolving the ingredients of the coating liquid include an attriter, a ball mill, a sand mill, a high-speed mixer, a Banbury mixer, a spec mixer, a roll mill, a three-roll mill, a nanomizer, a stumble mill, an epicyclical mill, a vibration mill, and kneader. Dispersing media such as glass beads, steel beads, zirconia beads, alumina balls, zirconia balls and flint stones may be additionally employed, if necessary.

Method for coating each photoreceptor layer includes completed using a known coating devices such as a deep coating, a spray coating, a wire bar coating, an applicator, a doctor blade, a roller coating, a curtain coating, bead coating.

The photosensitive layer may also contain various ingredients, such as antioxidants and light stabilizers for improving environmental resistance and stability against harmful light. Compounds used in this purpose include chromanol derivatives such as tocopherol, ether compounds of the chromanol derivatives, esterified compounds of the chromanol derivatives, polyarylalkane compounds, hydroquinone derivatives, monoether compounds of the hydroquinone derivatives, diether compounds of the hydroquinone derivatives, benzophenone derivatives, benzotriazole derivatives, thioether compounds, phenylenediamine derivatives, phosphonic esters, phosphorous esters, phenol compounds, hindered phenol compounds, linear amine compounds, cyclic amine compounds, and hindered amine compounds.

A conductive substrate is not limited only if it has conductivity. Its form is not specially limited to drum type. For example, substrate can be a metal drum made of aluminum, vanadium, nickel, copper, zinc, palladium, indium, silver, platinum, stainless, or chrome; a plastic drum made of a conductive plastic produced by dispersing a conductive material in a conductive plastic or a plastic; a metal sheet; or plastic substrates depositing or laminating metal.

The conductive substrate can optionally be coated with a "blocking layer" or an "undercoating layer" to prevent charge injection from the conductive substrate to the charge generation and transport layer. This blocking/undercoating layer also improves the adhesiveness between the conductive substrate and the charge generation and transport layer. Useful materials for this layer include metal oxides such as anodized alumina, and resins that can be formed easily as a film. No limiting examples of such resins include polyamides such as nylon 6, nylon 66, nylon 11, nylon 610, copolymerized nylon and alkoxymethylated nylon (these nylons are well known to those skilled in the art); casein; poly(vinyl alcohol); ethylene-acrylic acid copolymer; gelatin; and poly(vinyl butyral). Conductive, semiconductive or dielectric particles such as zinc oxide, titanium oxide, aluminum oxide; silicon nitride, silicon carbide and carbon black may also be dispersed into the foregoing resins for the undercoating layer.

The electrophotographic photoreceptor according to the first aspect of the present invention can be effectively applied to laser printer because it has good sensitivity in a long wavelength region around 780 nm. As a composition comprising metal bisphthalocyanine and a charge generation material, or a composition crystal containing metal bisphthalocyanine according to the present invention have a good stability in a coating liquid, an electrophotographic photoreceptor produced thereby shows stable image qualities and electric properties and low producing cost.

In the second aspect of the present invention, the inventor noted that a composition crystal comprising a phthalocyanine compound and a asymmetric phthalocyanine wherein a part of benzene ring in phthalocyanine structure is substituted with naphthalene ring, pyridine ring or pyrazine ring, is stable against crystal transfer such as agglomeration, precipitation, crystal growth, crystal habit transfer and crystal electric potential, and has good electric properties such as good sensitivity. When this composition crystal is used as a charge generation materials in an electrophotographic receptor, the electrophotographic photoreceptor shows good sensitivity and good image quality without noise.

In the second aspect of the present invention, a composition crystal comprising asymmetric phthalocyanine represented by the general formula (IV) and phthalocyanine compound represented by the general formula (V) is provided as a charge generation material:

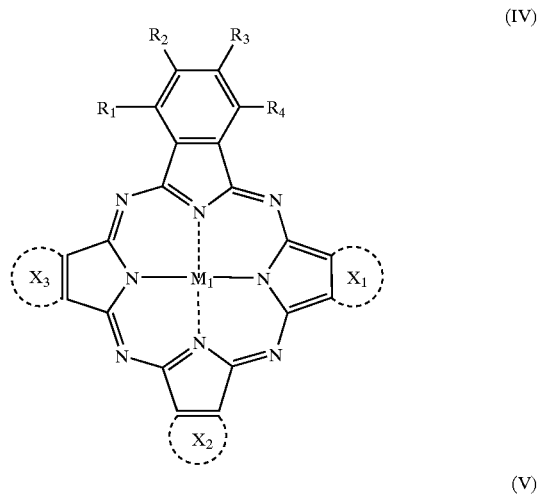

(IV)

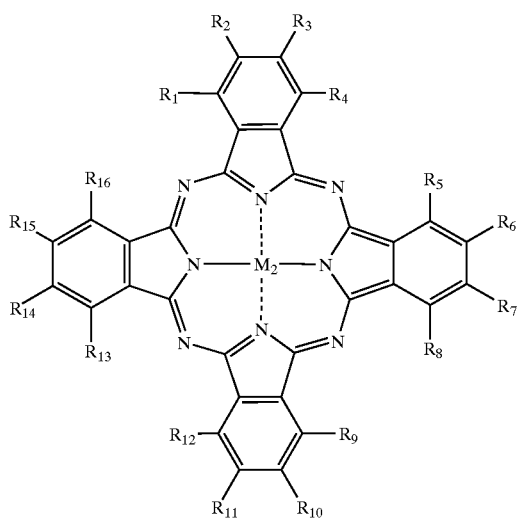

(V)

wherein $X_1$, $X_2$ and $X_3$ are each a benzene ring, a pyridine, a pyrazine ring, or a naphthalene ring to which a halogen atom, a nitro group, an alkyl group, or an alkoxy group may be bonded, provided that all of $X_1$, $X_2$ and $X_3$ are not a benzene ring and at least one of $X_1$, $X_2$ and $X_3$ is a naphthalene ring;

$R_1$~$R_{16}$ are each a hydrogen atom, a halogen atom, a nitro group, an alkyl group or an alkoxy group; and $M_1$ and $M_2$ are each an atom selected from the group consisting of hydrogen ($H_2$), Cu, Al to which chloride is bonded, and Ti, V, Zr, Ge, Ga and In atom to which oxygen, halogen atom or hydroxyl group is bonded.

Asymmetric phthalocyanine represented by the general formula (IV) is prepared by substituting at least one benzene ring of phthalocyanine compound with pyridine ring, pyrazine ring or naphthalene ring, to which halogen atom, alkyl group, nitro group or alkoxy group may be bonded. A metal that is bonded to the central of the phthalocyanine be selected from various central metals of phthalocyanine known to the art.

However, as the number of benzene substituting increase, a regularity of the asymmetric phthalocyanine to molecular planar and lamination direction is decreased. So, it is difficult to obtain a crystal form having a good sensitivity. Accordingly, it is preferable to regulate the number of benzene substituting 3 or less, more preferably 2 or less.

In the second aspect of the present invention, a composition crystal comprising asymmetric phthalocyanine and phthalocyanine compound is proposed as a charge generation material. Herein, a composition crystal means not a simple mixture of plural crystals each comprising uniform chemical compound but a crystal wherein at least two kinds of chemical compound are assembled into a molecular level in primary particle. It can be easily known from various analyzing method whether it is a composition or a composition crystal.

For example, X ray diffraction spectrum, infrared absorption spectrum and visible absorption spectrum show new diffractive angle and absorption peak in composition crystal. Though the spectrums are not changed, a mixture of crystals which are treated in the same manner and mixed in the same ratio with the crystal composition has different diffraction and absorption intensities and intensity ratio in the spectrums due to their different crystal habit, crystal face and growth degree.

To produce a composition crystal of asymmetric phthalocyanine compound and phthalocyanine compound, asymmetric phthalocyanine compound and phthalocyanine compound according to the first aspect of the present invention, should be mixed into molecular level. The mixing method can be a chemical method such as acid pasting method or acid slurry method wherein asymmetric phthalocyanine compound and phthalocyanine compound are solved in a heavy acid such as sulfuric acid into molecular level and then the solution is added to a supplementary solvent such as water with alcohol. The second method is a physical method wherein two kinds of molecule are physically assembled into an identical crystal through abrasion and grinding. In this mechanical method, each crystal is ground and scattered into amorphous form.

A composition crystal that is mixed into molecule level according to the above-mentioned method, can be used as a charge generation material without treatment. However, it can be transferred to other crystal form by a method known to the art. When transferring crystal form, the efficiency can be raised by treating the composition crystal in a temperature 10° C. higher than a treating temperature of composition without asymmetric phthalocyanine or by adding a crystal having a proposed crystal form as an inducing agent.

In the composition crystal of the present invention, a ratio of asymmetric phthalocyanine compound to phthalocyanine-based compound is 100 weight parts or less, preferably 0.01~50 weight parts, more preferably 0.01~20 weight parts, per 100 parts of phthalocyanine-based compound.

A grinding apparatus used in crystallization and transfer includes an attriter, a ball mill, a sand mill, a high-speed mixer, a Banbury mixer, a spec mixer, a roll mill, a three-roll mill, an nanomizer, a stumble mill, an epicyclical mill, a vibration mill and a kneader. Dispersing media such as glass beads, steel beads, zirconia beads, alumina balls, zirconia balls and flint stones may be additionally employed, if necessary. Dispersing auxiliary such as salt, glauber salt, and sodium carbonate may be added, if necessary.

A phthalocyanine compound represented by the general formula (V) is prepared by methods known to the art. For example, titanyloxy phthalocyanine is prepared by a condensation reaction of phthalodinitrile and titanium tetrachloride or a reaction of 1,3-diiminoisoindoline and tetraalkoxy titanium.

Asymmetric phthalocyanine compound is prepared by substituting a part of phthalodinitrile, phthalimide, or phthalic acid to dinitirile body such as pyridinodinitrile, pyrazinodinitrile, 1,2-dicyanonaphthalene, and 2,3-dicyanonaphthalene; imide body; and dicarboxyl acid body.

As it is preferable to regulate the number of benzene substituting in phthalocyanine structure 3 or less, more preferably 2 less, a mole ratio of dicyano compound and phthadinitrile is regulated 3/1 or less, more preferably 2/2 or less when preparing asymmetric phthalocyanine compound.

As a central atom of the phthalocyanine compound according to the second aspect of the present invention, various kind of central atom of phthalocyanine compound known to the art can be used, but preferably, hydrogen, copper, and titanium, vanadium, germanium, gallium, indium and aluminum to which halogen atom, hydroxyl group or oxygen is bonded. In addition, a mixture of the metals can be used.

In the composition crystal according to the second aspect of the present invention, the phthalocyanine compound can be any of known phthalocyanines and their derivatives. Preferably, it is one or more selected form the group comprising metal-free phthalocyanine, titanyl oxy phthalocyanine, vanadyl oxy phthalocyanine, copper phthalocyanine, chloroaluminum phthalocyanine, chlorogallium phthalocyanine, chloroindium phthalocyanine, dichlorogermanium phthalocyanine, hydroxyaluminum phthalocyanine, hydroxygallium phthalocyanine, hydroxyindium phthalocyanine and dihydroxygermanium phthalocyanine If the central atoms of the asymmetric phthalocyanine compound and the phthalocyanine compound are the same, it is possible to produce asymmetric phthalocyanine compounds and phthalocyanine compound at the same time by regulating the mole ratio of dicyano compound and phthalonitrile 2/2 or less.

Specially, when the number of benzene substituting in a molecule is small, it is preferred to produce the asymmetric phthalocyanine compound and the phthalocyanine compound at the same time in a view of reaction probability theory.

An organic solvent used in the reaction of asymmetric phthalocyanine compound and phthalocyanine compound is preferably an inactive solvent having high boiling point such as α-chloronaphthalene, β-chloronaphthalene, α-methylnaphthalene, methoxynaphthalene, diphenylnaphthalene, ethylene glycol dialkyl ether, quinoline, sulfolane, dichlorobenzene, N-methyl-2-pyrrolidone, dichlorotoluene, etc.

Asymmetric phthalocyanine and phthalocyanine compound synthesized according to the above mentioned method are purified using acid, alkali, acetone, methanol, ethanol, methylethylketone, tetrahydrofurane, pyridine, quinoline, sulfolane, α-chloronaphthalene, toluene, xylene, dioxane, chloroform. dichloroethane, N,N-dimethylform amide, N-methyl-2-pyrrolidone or water for electrophotographic application. The purification method includes, not limited, extraction method such as washing method, recrystallization method and soxhlet method, heat suspension method, sublimation method, etc. However, any method through which unreacted materials and additional products are removed, can be applied.

In the composition crystal, the used phthalocyanine compound can include any of phthalocyanines and their derivatives known to the art. Preferably, it can be at least one selected form the group consisting of metal-free phthalocyanine, titanyl oxy phthalocyanine, vanadyl oxy phthalocyanine, copper phthalocyanine, chloroaluminum phthalocyanine, chlorogallium phthalocyanine, chloroindium phthalocyanine, dichlorogermanium phthalocyanine, hydroxyaluminum phthalocyanine, hydroxygallium phthalocyanine, hydroxyindium phthalocyanine and dihydroxygermanium phthalocyanine.

The photoreceptor according to the present invention can be formed by laminating a charge generation layer and a charge transport layer on a conductive substrate for effective charge generation and charge transport or by forming a charge generation transport layer in which charge generation and charge transport are done together. In the case of the multi-layered type photoreceptor, the charge generation layer is prepared by dispersing a charge generation composition or composition crystal according to the present invention in a solvent with an appropriate resin, coating the dispersed solution on a conductive substrate, and then drying. The content of a charge generation material in a charge generation layer is 10~80 wt %, preferably 30~70 wt %. The thickness of a charge generation layer is 0.001~10 $\mu$m, preferably, 0.05~2 $\mu$m. When the thickness of a charge generation layer is below 0.001 $\mu$m, it cannot be formed uniformly. On the contrary, when over 10 $\mu$m, electrophotographic properties are deteriorated.

On a charge generation layer, a charge transport layer comprising charge transport material is coated. If the charge transport material can be coated by itself, a charge transport layer can be formed by using only charge generation material. Otherwise, a charge generation material is solved in a liquid with a resin having coatibility and the coating liquid is coated on a charge generation layer to form a charge transport layer. The thickness of layer can be adequately regulated according to the purpose of the electrophotographic photoreceptor but it is preferable to regulate from 5 to 50$\mu$.

Charge transport material can be a hole transport material that transports holes or an electron transport material that transports electrons. When the multi-layered type photoreceptor is used in a negative-charging method, a hole transport material is used as a charge transport material. When it is used in a positive-charging method, an electron transport material is used. In addition, a mixture of a hole transport material and an electron transport can be used when there is needed both negative and positive characters.

In the case of a mono-layered photoreceptor, a charge transport materials, a composition or a composition crystal according to the present invention, and resin are solved in a solvent. The dispersed solution is coated on a conductive substrate and then dried to form a charge generation transport layer. As phthalocyanine has photoconductivity and ability to transport charge, the use of an electron transport material is optional. When electron transport material is not used, the content of a composition or composition crystal according to the present invention in a charge generation transport layer is 3~40 wt %. However, a charge transport material known to the art is used to improve flexibility and charge transport efficiency. When a charge generation transport material is used, the content of a composition or composition crystal according to the present invention is 0.1~20 wt %, preferably 0.2~5 wt % and the content of resin is 20~70 wt %. A charge transport material used in a charge generation transport layer can be selected from the group consisting of hole transport materials, electron transport materials, and mixtures thereof. Preferably, a mixture of hole transport material and electron transport is used because both electron and charge are transported in a charge generation transport layer. The ratio of a hole transport material and an electron transport material is regulated according polarity and mobility of charge. The thickness of charge generation transport layer is preferably 5~50$\mu$.

In addition to the charge generation composition or charge generation transport composition according to the present invention, dyes and pigments for regulating spectral sensitivity can be used jointly. As this materals, bisazo-based compounds, triazo-based compounds, antraquinone-based compounds, perylene-based compounds, perynone-based compounds, azulenium salt-based compounds, squarylium salt-based compounds, pyrrolopyrrole-based compounds, naphthalocyanines and phthalocyanines are represented.

The hole transport material used together with charge generation material according to the present invention includes oxadiazole-based compounds, styrene compounds, aryl amine compounds, oxazole-based compounds, pyrazolines, pyrazolone-based compounds, stilbene compounds, polyarylalkane-based compounds, polyvinylcarbazole and their derivatives, polymers of N-acrylamide methyl carbazole, quinoxaline polymer, vinyl polymer, triphenylmetane polymer, styrene copolymer, polyacenaphthene, polyindene, acenaphthylene-styrene copolymer and formaldehyde-based condensation resins.

In the photosensitive layers, an electron acceptor can be added for improvement of sensitivity and reduction of residual electric potential and fatigue damage. Useful electron acceptor compounds include compounds exhibiting a large electron affinity, such as succinic anhydride, maleic anhydride, dibromosuccinic anhydride, phthalic anhydride, 3-nitrophthalic anhydride, 4-nitrophtalic anhydride, pyromellitic anhydride, pyromellitic acid, trimellitic acid, trimellitic anhydride, phthalimide, 4-nitrophthalimide, tetracyanoethylene. teracyanoquinodimethane, chloranil, bromanil, o-nitrobenzoic acid, and p-nitrobenzoic acid. The ratio of organic receptor is 0.01~100 wt % to a carrier generation material.

Electron transport material used in the present invention includes benzoquinone-based compounds, naphthoquinone-based compounds, antraquinone-based compounds, malononitrile-based compounds, fluorene-based compounds, dicyanofluorene-based compounds, benzoquinone imide-based compound, diphenoquinone-based compounds, stilbenequinone-based compounds, diiminoquinone-based compounds, dioxotetracenedion compounds and thiopyrrane compounds. In addition, any material with mobility faster than $10^{-8}$ cm$^2$/s can be used as a charge transport material that transports charge such as hole or electron in charge generation layer or charge generation transport layer. Also, a mixture of at least two charge transport materials can be used.

A resins used in forming charge generation layer, charge generation transport layer, or charge transport layer can be an dielectric resin or an organic photoconductive polymer having film forming character such as poly-N-vinylcarbazole and polyvinyl anthracene. Resins useful herein include poly(vinyl butyral), polyallylate (condensation polymer of bisphenol A and phthalic acid), polycarbonate, polyester, phenoxy resin, poly vinyl acetate, acrylic resin, polyacryle amide resin, polyamide, polyvinylpyridine, cellulose-based resin, urethane resin, epoxy resin, silicon resin, polystyrene, polyketone, polyvinyl chloride, vinyl chloride-vinyl acetate copolymer, polyvinyl acetal, poly acrylonitrile, phenol resin, melamine resin, casein, polyvinyl alcohol, and polyvinylpyrrolidone.

A solvent used in a coating liquid of charge generation layer, charge transport layer, or charge generation transport layer is selected according to resin. Preferred is a solvent which dose not affect neighbor layer. Solvents useful herein include benzoic hydrocarbons such as, benzene, xylene, ligroin, monochlorobenzene and dichlorobenzene; ketones such as acetone, methylethylketone and cyclohexanone; alcohols such as methanol, ethanol and isopropanol; esters such as ethyl acetate and methylcellosolve; aliphatic halogenized hydrocarbons such as carbon tetrachloride, chloroform, dichlormethane, dichlorethane and trichlorethylene; ethers such as tetrahydrofuran, dioxane, dioxolane and ethylene glycol monomethyl ether; amides such as N,N-dimethylformamide and N,N-dimethylacetamide; and sulfoxides such as dimethyl sulfoxide.

The instruments useful for dispersing or for dissolving the ingredients of the coating liquid include an attriter, a ball mill, a sand mill, a high-speed mixer, a Banbury mixer, a spec mixer, a roll mill, a three-roll mill, a nanomizer, a stumble mill, an epicyclical mill, a vibration mill, and a kneader. Dispersing media such as glass beads, steel beads, zirconia beads, alumina balls, zirconia balls and flint stones may be additionally employed, if necessary.

Method for coating each photoreceptor layer includes completed using a known coating devices such as a deep coating, a spray coating, a wire bar coating, an applicator, a doctor blade, a roller coating, a curtain coating, bead coating.

The photosensitive layer may also contain various ingredients, such as antioxidants and light stabilizers for improving environmental resistance and stability against harmful light. Compounds used in this purpose include chromanol derivatives such as tocopherol, ether compounds of the chromanol derivatives, esterified compounds of the chromanol derivatives, polyarylalkane compounds, hydroquinone derivatives, monoether compounds of the hydroquinone derivatives, diether compounds of the hydroquinone derivatives, benzophenone derivatives, benzotriazole derivatives, thioether compounds, phenylenediamine derivatives, phosphonic esters, phosphorous esters, phenol compounds, hindered phenol compounds, linear amine compounds, cyclic amine compounds, and hindered amine compounds.

A conductive substrate is not limited only if it has conductivity. Its form is not specially limited to drum type. For example, substrate can be a metal drum made of aluminum, vanadium, nickel, copper, zinc, palladium, indium, silver, platinum, stainless, or chrome; a plastic drum made of a conductive plastic produced by dispersing a conductive material in a conductive plastic or a plastic; a metal sheet; or plastic substrates depositing or laminating metal.

The conductive substrate can optionally be coated with a "blocking layer" or an "undercoating layer" to prevent charge injection from the conductive substrate to the charge generation and transport layer. This blocking/undercoating layer also improves the adhesiveness between the conductive substrate and the charge generation and transport layer. Useful materials for this layer include metal oxides such as anodized alumina, and resins that can be formed easily as a film. No limiting examples of such resins include polyamides such as nylon 6, nylon 66, nylon 11, nylon 610, copolymerized nylon and alkoxymethylated nylon (these nylons are well known to those skilled in the art); casein; poly(vinyl alcohol); ethylene-acrylic acid copolymer; gelatin; and poly(vinyl butyral). Conductive, semiconductive or dielectric particles such as zinc oxide, titanium oxide, aluminum oxide; silicon nitride, silicon carbide and carbon black may also be dispersed into the foregoing resins for the undercoating layer.

The electrophotographic photoreceptor according to the second aspect of the present invention can be effectively applied to laser printer because it has good sensitivity in a long wavelength region around 780 nm. As a composition comprising asymmetric phthalocyanine and a charge generation material, or a composition crystal containing metal bisphthalocyanine according to the present invention have a good stability in a coating liquid, an electrophotographic photoreceptor produced thereby shows stable image qualities and electric properties and low producing cost.

PREFERRED EMBODIMENT OF THE PRESENT INVENTION

Having generally described this invention, a further understanding can be obtained by reference to certain specific examples that are provided herein for purposes of illustration only and are not intended to be limiting unless otherwise specified.

PRODUCING EXAMPLE 1

Phthalonitrile 18.4 weight parts (0.144 mole) was added to α-chloronaphthalene 120 weight parts, and then titanuum tetrachloride 6.92 weight parts (0.0364 mole) was dropped thereto under nitrogen atmosphere. After dropping, the reactant was heated and agitated for 3 hours at 200~220° C. After filtered at the temperature of 100~130° C., the product was washed with α-chloronaphthalene and then methanol, and vacuum-heated to obtain dichlorotitanium phthalocyanine 9.5 weight parts (yield ratio 42 wt %) was obtained.

The dichlorotitanium phthalocyanine 8.9 weight parts (0.014 mole) and dilithium phthalocyanine 8.0 weight parts (0.014 mole: manufactured by Aldrich Co., Ltd.) were added to α-chloronaphthalene 100 weight parts and then reacted for 5 hours at 180~200° C. under nitrogen atmosphere. The product was washed with α-chloronaphthalene and then methanol, vacuum-heated at 60° C. to obtain titanium bisphthalocyanine product 14.5 weight parts. The titanium bisphthalocyanine product was vacuum-heated again to extract purple crystal by sublimation. The resulted rough crystal over 100 micron was verified to be titanium bisphthalocyanine from mass spectrum and absorption spectrum. The titanium bisphthalocyanine was grinded in a ball mill with zirconia balls for 48 hours to obtain pigment having a diameter below $0.1\mu$.

PRODUCING EXAMPLE 2

Diaminoisoindoline 14.7 weight parts (brand name Phthalogen Blue IF3G manufactured by BASF Co., Ltd.) was added to quinoline 120 weight parts, and then zirconium tetrachloride 2.9 weight parts was dropped thereto under nitrogen atmosphere. After dropping, the reactant was heated and agitated for 3 hours at 200~230° C. After filtered at the temperature of 100~130° C., the product was washed with quinoline and then methanol. Then, 0.1 wt % hydrochloric acid aqueous solution 500 weight parts was added to the product, and heated for 30 minutes. After filtered and dried in vacuum drier, zirconium bisphthalocyanine product 6.8 weight parts was obtained. The zirconium bisphthalocyanine product was vacuum-heated again to extract purple crystal by sublimation. The resulted rough crystal over 100 microns was verified to be zirconium bisphthalocyanine from mass spectrum and absorption spectrum.

PRODUCING EXAMPLE 3

Titanyl bisphthalocyanine pigment 0.3 weight parts produced by Producing Example 1, Y type titanyl phthalocyanine 9.7 weight parts produced by a method of Japanese Patent Application Laying-open 2-131243, and tetrahydrofuran 500 weight parts were agitated in a paint conditioner with low-alkali glass beads having a diameter of 3 mm to produce a dispersed liquid of charge generation composition A. Herein, a resin liquid comprising vinyl chloride copolymer resin (MR-110 manufactured by Nippon Zeon Co., Ltd.) 10 weight parts and tetrahydrofuran 500 weight parts was added and dispersed for 1 hour to obtain a charge generation coating liquid A.

PRODUCING EXAMPLE 4

Titanium bisphthalocyanine 0.3 weight part produced in Producing Example 1 and titanyl phthalocyanine 9.7 weight parts were solved in sulfuric acid 100 weight parts. The solution was poured into water 1000 weight parts for precipitation. The precipitate was washed until acid was not detected. Then, wet paste of the composition crystal was dried at 60° C. The powder X ray diffraction spectrum of the resulted composition crystal B was amorphous type having low crystallinity.

Then, the composition crystal B 10 weight parts, vinyl chloride copolymer resin (MR110 manufactured by Nippon Zeon Co., Ltd.) and tetrahydrofuran 1000 weight parts was dispersed in a paint conditioner with alkali glass beads having a diameter of 3 mm for 2 hours to produce a charge generation coating liquid B.

PRODUCING EXAMPLE 5

Wet paste of a composition crystal produced in Producing Example 4, 10 weight parts and dichlorobenzene 100 weight parts were dispersed in 1L of ball mill with zirconia balls having a diameter of 5 mm. The dispersed liquid was poured into acetone to precipitate crystal. The precipitate was dried at 60° C. The resulted composition crystal C was Y type titanyl phthalocyanine that has strong peak at Bragg diffraction angle (2θ) of 27.3 degree in X ray diffraction spectrum. A charge generation coating liquid C was made using the composition crystal C according to the same method in Producing Example 4.

PRODUCING EXAMPLE 6

Zirconium bisphthalocyanine 1.5 weight part produced by Producing Example 2 and titanyl phthalocyanine 8.5 weight parts were solved in sulfuric acid 100 weight parts. The solution was poured into water 1000 weight parts for precipitation. The precipitate was separated through filtration and washed until acid was not detected. Then, wet paste of the composition crystal 10 weight parts and dichlorobenzene 100 weight parts were dispersed in 1L ball mill with zirconia balls having a diameter of 5 mm for 78 hours. The dispersed liquid was poured into acetone. The precipitate was separated and dried at 60° C. The resulted composition crystal D was Y type titanyl phthalocyanine having strong peak at 27.3 degree in X ray diffraction spectrum. A charge generation coating liquid D was made using the composition crystal D according to the same method as Producing Example 4.

COMPARATIVE PRODUCING EXAMPLE

Composition crystal E was produced according to the same method in Producing Example 6 except that zirconium bisphthalocyanine was replaced by titanyl phthalocyanine. The composition crystal E showed Y type character in X ray diffraction spectrum. A charge generation coating liquid E was made using the composition crystal E according to the same method as Producing Example 4.

PRODUCING EXAMPLE 7

Metal-free phthalocyanine 9.5 weight parts and titanium bisphthalocyanine 0.45 weight part produced in Producing Example were solved in heavy sulfuric acid 100 weight parts through agitation. The solution was poured into water 1000 weight parts for precipitating crystal. The crystal was separated through filtration, washed with water and dried. The resulted crystal was α type having low crystallinity in X ray diffraction spectrum. The obtained composition 0.95 weight part and X type phthalocyanine 0.05 weight part were dispersed in 1L ball mill with zirconia balls having a diameter of 5 mm for 150 hours. The resulted composition crystal F showed X type character in X ray diffraction spectrum.

COMPARATIVE PRODUCING EXAMPLE 2

Composition crystal G was produced according to the same method in Producing Example 7 except that titanium bisphthalocyanine was replaced by metal-free phthalocyanine. The composition crystal G showed X type character in X ray diffraction spectrum.

EXAMPLE 1

The charge generation coating liquids A, B, C and D were placed at room temperature for 1 week, coated on anodized alumina cylinder and dried to form a charge generation layer in the thickness of 0.1μ. On the resulted charge generation layer, charge transport liquid produced by solving p-diethylaminobenzaldehyde-methyl-phenylhydrazone 49 weight parts, anti-oxidizer (brand name Iruganox 565 manufactured by Ciba-Geigy Co., Ltd.) 1 weight part and polycarbonate resin (Panlite C-1400 manufactured by Teijin Chemicals Co., Ltd.) 50 weight parts in dichloromethane 700 weight parts, was coated and dried to form a charge transport layer in the thickness of 20μ. The resulted multi-layered type photoreceptor was tested with electrostatic copying paper tester (EPA8100 manufactured by Kawaguchi Electro Work Co., Ltd.) using 780 nm light source. Image qualities were tested using negative-charging laser beam printer (manufactured by Canon Inc.). Photoreceptors were made using a coating liquids right after and 1 week after preparation. The properties of photoreceptors and coating liquids such as the electric properties, image qualities and dispersing stability of crystal were represented in Tables 1 and 2 to evaluate.

COMPARATIVE EXAMPLE 1

Except that the charge generation coating liquids A, B, C and D were replaced with the charge generation coating liquid E produced in Comparative Producing Example 1, it was equally practiced with Example 1. The results were represented in Tables 1 and 2.

As shown Tables 1 and 2, electric properties and image qualities of electrophotographic photoreceptor using charge generation coating liquids containing metal bisphthalocyanine were not changed, but the charge generation composition of Comparative Example (charge generation coating liquid not containing metal bisphthalocyanine) was agglomerated and precipitated and as the result, sensitivity was lowered and black dots and white streaks happened in the image.

EXAMPLE 2

To the composition crystal F 1 weight part produced by Producing Example 7, tetra-N,N,N',N'-toluyl-benzidine 37 weight parts, 3,5-dimethyl-3'5'-di-t-buthyl-4,4'-diphenoquinone 12 weight parts, polycarbonate resin 50 weight parts (Panlite C-1400 manufactured by Teijin Chemical Co., Ltd.) and dichloromethane 700 weight parts were added and dispersed in paint shaker with zirconia beads having a diameter of 3 mm for 3 hours to produce charge generation transport coating liquid F. The liquid was placed at room temperature for 1 week, coated and dried on anodized alumina cylinder in the thickness of 20µ. The resulted laminated-type photoreceptor was tested with electrostatic copying paper tester (EPA8100 manufactured by Kawaguchi Electro Work Co., Ltd.) using 780 nm light source. Image qualities were tested using positive-charging laser beam printer (manufactured by Brother Co., Ltd). Photoreceptors were made using a coating liquids right after and 1 week after preparation. The properties of photoreceptors and coating liquids such as the electric properties, image qualities and dispersing stability of crystal were represented in Tables 1 and 2 to evaluate.

COMPARATIVE EXAMPLE 2

Except that the charge generation coating liquid F was replaced with the charge generation coating liquid G produced in Comparative Producing Example 2, it was equally practiced with Example 2. The results were represented in Tables 1 and 2.

As shown Tables 1 and 2, electric properties and image qualities of charge generation transport coating liquids containing metal bisphthalocyanine were not changed, but in the charge generation transport coating liquid of Comparative Example 2 not containing metal bisphthalocyanine, crystal was agglomerated and precipitated and as the result, sensitivity was lowered and black dots and white streaks happened in the image.

In Tables 1 and 2, an electric property $V_0$ represents surface electric potential (volt) right after charging, $E1/2$ represents an exposure energy ($\mu J/cm^2$) when a surface electric potential right after exposure is reduced to half level, $Vk5$ is a maintenance ratio (wt %) of surface electric potential in darkness and $Vr5$ is a residual potential (volt) 5 seconds after the end of exposure.

TABLE 1

| Right After Preparation | | Example 1 | | | | Comparative Example 1 | Example 2 | Comparative Example 2 |
|---|---|---|---|---|---|---|---|---|
| Photoreceptor | | A | B | C | D | E | F | G |
| Coating Liquid | | A | B | C | D | E | F | G |
| Electric Properties | $V_0$ | −600 | −600 | −600 | −600 | −600 | 600 | 600 |
| | Vk5 | 95.3 | 93.4 | 94.8 | 95.1 | 93.8 | 90.8 | 92.1 |
| | E1/2 | 0.12 | 0.26 | 0.11 | 0.10 | 0.11 | 0.24 | 0.22 |
| | Vr5 | 5 | 8 | 3 | 4 | 4 | 19 | 18 |
| Image Qualities | Black Dots | None | None | None | None | None | None | None |
| | White Streaks | None | None | None | None | None | None | None |
| Coating Liquid Appearance | Precipitation | None | None | None | None | None | None | None |

TABLE 2

| A Week After Preparation | | Example 1 | | | | Comparative Example 1 | Example 2 | Comparative Example 2 |
|---|---|---|---|---|---|---|---|---|
| Photoreceptor | | A | B | C | D | E | F | G |
| Coating Liquid | | A | B | C | D | E | F | G |
| Electric Properties | $V_0$ | −600 | −600 | −600 | −600 | −600 | 600 | 600 |
| | Vk5 | 95.1 | 93.7 | 94.7 | 95.0 | 95.9 | 91.6 | 94.3 |
| | E1/2 | 0.12 | 0.28 | 0.12 | 0.11 | 0.26 | 0.26 | 0.37 |
| | Vr5 | 6 | 8 | 4 | 7 | 15 | 22 | 43 |
| Image Qualities | Black Dots | None | None | None | None | Numerous | None | Numerous |
| | White Streaks | None | None | None | None | Existent | None | Existent |
| Coating Liquid Appearance | Precipitation | None | None | None | None | Existent | None | Existent |

PRODUCING EXAMPLE 8

Phthalonitrile 24.96 weight parts (0.195 mole) and 1,2-dicyanonaphthalene 0.89 weight part (0.005 mole) was added to α-chloronaphthalene 120 weight parts. Then titanium tetrachloride 9.485 weight parts (0.05 mole) was dropped thereto under nitrogen atmosphere. After dropping, the reactant was heated and agitated for 3 hours at 200~220° C. After filtered at the temperature of 100~130° C., the product was washed with α-chloronaphthalene, methanol, and water, and then dispersed in 5 wt % ammonia water 1000 weight parts. The solution was agitated for 2 hours at 90° C. The precipitate was separated through filtering and vacuum-heated at 60° C. to obtain a mixture of titanyl oxy phthalocyanine and the titanyl oxy phthalocyanine wherein a benzene ring is substituted with naphthalene, 23.3 weight parts. When the titanyl oxy phthalocyanine mixture was analyzed by mass spectrum, asymmetric titanyl oxy phthalocyanine wherein one of benzene rings is substituted with 1,2-naphthalene was contained in a content of 8.9 wt % viewing the intensity ratio.

PRODUCING EXAMPLE 9

The mixture produced in Producing Example 8, 20 wt % was solved in 98 wt % heavy sulfuric acid 200 weight parts through agitation at 0° C. The solution was poured into water 2000 weight parts to precipitate titanyl oxy phthalocyanine and asymmetric titanyl oxy phthalocyanine. The precipitate was washed until it showed neutrality. A part of the wet paste was dried under evacuation to obtain composition crystal (A0). The composition crystal showed X ray diffraction spectrum having a bad crystallinity in powder X ray diffraction.

PRODUCING EXAMPLE 10

The wet paste produced in Producing Example 9 was added to dichlorobenzene 200 weight parts and dispersed in 1L ball mill for 78 hours with zirconia balls having a diameter of 5 mm. The dispersed liquid was poured into acetone to precipitate crystal. The crystal was separated and dried at 60° C. to obtain a composition crystal A1. The composition crystal A1 was Y type titanyl pthalocyanine having a strong peak at 27.3 degree in X ray diffraction spectrum.

PRODUCING EXAMPLE 11

The composition crystal (A1) 10 weight parts, vinyl chloride copolymer resin (MR 110 manufactured by Nippon Zeon Co., Ltd.) and tetrahydrofuran 1000 weight parts were dispersed in a paint conditioner with alkali glass bead balls having a diameter of 3 mm for 2 hours to produce charge generation coating liquid (A2).

COMPARATIVE PRODUCING EXAMPLE 3

1,2-dicyanonaphthalene produced in Producing Example 8 was substituted to the same mole of phthalonitrile. When titanyl oxy phthalocyanine crystals related to Producing Examples 8~10 are represented by (a0) and (a1), (a1) was Y type phthalocyanine crystal from. The titanyl phthalocyanine (a1) was identically treated with Producing Example 11 to produce a charge generation coating liquid (a2).

EXAMPLE 3

The charge generation coating liquids A2 produced in Producing Example 11 was placed at room temperature for 1 week, coated on anodized alumina cylinder and dried to form a charge generation layer in the thickness of 0.1μ. On the resulted charge generation layer, charge transport liquid produced by solving p-diethylaminobenzaldehyde-methylphenylhydrazone 49 weight parts, anti-oxidizer (brand name Irganox 565 manufactured by Ciba-Geigy Co., Ltd.) 1 weight part and polycarbonate resin (Panlite C-1400 manufactured by Teijin Chemicals Co., Ltd.) 50 weight parts in dichloromethane 700 weight parts, was coated and dried to form a charge transport layer in the thickness of 20μ. The resulted multi-layered type photoreceptor was tested with electrostatic copying paper tester (EPA8100 manufactured by Kawaguchi Electro Work Co., Ltd.) using 780 nm light source. Image qualities were tested using negative-charging laser beam printer (manufactured by Canon Inc.). Photoreceptors were made using a coating liquids right after and 1 week after preparation. The properties of photoreceptors and coating liquids such as the electric properties, image qualities and dispersing stability of crystal were represented in Table 2.

COMPARATIVE EXAMPLE 3

Except that the charge generation coating liquid (A2) was replaced with the charge generation coating liquid (a2) produced in Comparative Producing Example 3, it was equally practiced with Example 3. The result was represented in Table 3.

As shown in Table 3, electric properties and image qualities of charge generation transport coating liquids containing asymmetric titanyloxy phthalocyanine were not changed, but in the charge generation transport coating liquid of Comparative Example 2 not containing asymmetric titanyloxy phthalocyanine, crystal was agglomerated and precipitated and as the result, sensitivity was lowered and black dots and white streaks happened in the image.

TABLE 3

| Negative Charging Photoreceptor Coating Liquid | | Right After Preparation | | A Week After Preparation | |
|---|---|---|---|---|---|
| | | A2 Example 3 | a2 Comparative Example 3 | A2 Example 3 | a2 Comparative Example 3 |
| Electric Properties | $V_o$ | −600 | −600 | −600 | −600 |
| | Vk5 | 95.1 | 93.4 | 93.8 | 90.8 |
| | E1/2 | 0.12 | 0.10 | 0.11 | 0.24 |
| | Vr5 | 5 | 7 | 4 | 15 |
| Image Qualities | Black Dots | None | None | None | Existent |
| | White Streaks | None | None | None | Existent |
| Coating Liquid Appearance | Precipitation | None | None | None | Existent |

PRODUCING EXAMPLE 12

Phthalonitrile 24.96 weight parts (0.195 mole) and 1,2-dicynonaphthalene 0.89 weight part (0.005 mole) was added to N-methyl-2-pyrrolidone 120 weight parts. Then 1,8-diazabicyclo[5.4.0]-7-undecene 1 weight part dropped thereto under nitrogen atmosphere. After dropping was done, the reactant was heated and agitated for 3 hours at 200~220° C. After filtered at 100~130° C., the reactant was washed with N-methyl-2-pyrrolindone, methanol and water, and was dried at 60° C. under evacuation. The resulted compound was 21.1 weight parts of composition comprising metal-free phthalocyanine wherein one benzene ring is substituted with 1,2-naphthalene ring. When the composition was analyzed by mass spectrum, asymmetric metal-free phthalocyanine wherein one of benzene rings is substituted with 1,2-naphthalene was contained in a content of 8.5 wt % viewing the intensity ratio.

PRODUCING EXAMPLE 13

The composition 20 weight parts, produced in Producing Example 12 was solved in 98 wt % heavy sulfuric acid 200 weight parts at 0° C. The solution was poured into water 2000 weight parts with agitating to precipitate metal-free phthalocyanine and asymmetric metal-free phthalocyanine wherein one of benzene rings is substituted with 1,2-naphthalene ring. The precipitate was washed with water and dried in vacuum to obtain a composition crystal B0 of metal-free phthalocyanine and asymmetric phthalocyanine. The composition crystal B0 showed α type characters in X ray diffraction spectrum.

PRODUCING EXAMPLE 14

The composition crystal (B0) 9.5 weight parts produced in Producing Example 13 and X type phthalocyanine 0.5 weight part was dispersed in a 1L ball mill for 150 hours with zirconia balls having a diameter of 5 mm. The resulted composition crystal (B1) showed X type character in X ray diffraction spectrum.

COMPARATIVE PRODUCING EXAMPLE 4

1,2-dicyanonaphthalene was substituted to phthalonitrile and treated according to the same method in Producing Examples 13 and 14. The resulted metal-free phthalocyanine (b1) showed X type character in X ray diffraction spectrum.

EXAMPLE 4

Tetra-N,N,N',N'-toluyl-benzidine 37 weight parts, 3,5-dimethyl-3',5'-di-t-butyl-4,4'-diphenoquinone 12 weight, polycarbonate resin 50 weight parts (Panlite C-1400 manufactured by Teijin Chemicals Ltd.) and dichloromethane 700 weight parts was added to each of the composition crystal (B1) 1 weight part produced in Producing Example 14, and X type phthalocyanine (b1) 1 weight part produced in Comparative Example 2. The mixture was dispersed for 3 hours in paint shaker with zirconia beads having a diameter of 3 mm to produce a charge generation transport coating liquid (B2) and a charge generation transport coating liquid (b2). Each liquid was placed at room temperature for 1 week after prepared and coated on anodized aluminum cylinder and dried to for a charge generation transport layer in the thickness of $20\mu$. The resulted photoreceptor was tested with electrostatic copying paper analyzer (EPA8100 manufactured by Kawaguchi Electro Work Co., Ltd) using 780 nm light source. Image qualities were tested using negative-charging laser beam printer (Canon Co., Ltd.) on the market. The properties of the photoreceptor and coating liquid were estimated right after preparation and a week after preparation and represented in Table 4. As shown Table 4, electric properties and image properties of photoreceptor by a composition crystal comprising asymmetric titanyl oxy phthalocyanine and titanyl oxy phthalocyanine, were not changed, but the charge generation composition comprising only titanyl oxy phthalocyanine by Comparative Example 3 was agglomerated and precipitated and as the result, sensitivity was lowered and black dots and white streaks happened in the image.

TABLE 4

| | | Right After Preparation | | A Week After Preparation | |
|---|---|---|---|---|---|
| Positive-Charging Photoreceptor Coating Liquid | | B2 Example 4 | b2 Comparative Example 4 | B2 Example 4 | b2 Comparative Example 4 |
| Electric Properties | $V_o$ | 600 | 600 | 600 | 600 |
| | Vk5 | 92.0 | 93.9 | 91.6 | 95.3 |
| | E1/2 | 0.18 | 0.23 | 0.26 | 0.38 |
| | Vr5 | 22 | 25 | 22 | 41 |
| Image Qualities | Black Dots | None | None | None | Numerous |
| | White Streaks | None | None | None | Existent |
| Coating Liquid Appearance | Precipitation | None | None | None | Existent |

EXAMPLE 5

1,2-dicyanonaphthalene related to Producing Examples 8 and 12 was substituted to the same mole of 2,3-dicyanonaphthalene or pyridinonitrile, pyrazinonitrile. The product was equally treated with Producing Examples 9~11. Then sequential treatment processes of Example 3, Producing Example 13 and Example 4 was executed in due course. X ray diffraction of each product after the treatment showed the same character as Examples 9~11. Using the products, charge generation coating liquids and charge generation transport liquids were prepared. Each liquid was placed at room temperature for 1 week after prepared and used in a electrophotographic photoreceptor. Electric properties and image properties of photoreceptor by a composition crystal comprising asymmetric phthalocyanine compound showed good image qualities without black dots and white streaks. Also, there was no agglomeration in the liquid by a composition crystal comprising asymmetric phthalocyanine compound after 1 week.

In Tables 3 and 4, an electric property $V_0$ represents surface electric potential (volt) right after charging, E1/2 represents an exposure energy ($\mu J/cm^2$) when a surface electric potential right after exposure is reduced to half level, Vk5 is a maintenance ratio (wt %) of surface electric potential in darkness and Vr5 is a residual potential (volt) 5 seconds after the end of exposure The electrophotographic receptor according to the present invention shows good image qualities when applied to copying machines, printers, fax machines, etc.

I claim:

1. An electrophotographic photoreceptor containing a composition comprising an asymmetric phthalocyanine compound represented by the general formula (IV) and a phathalocyanine compound represented y the general formula (V) as a charge generation material:

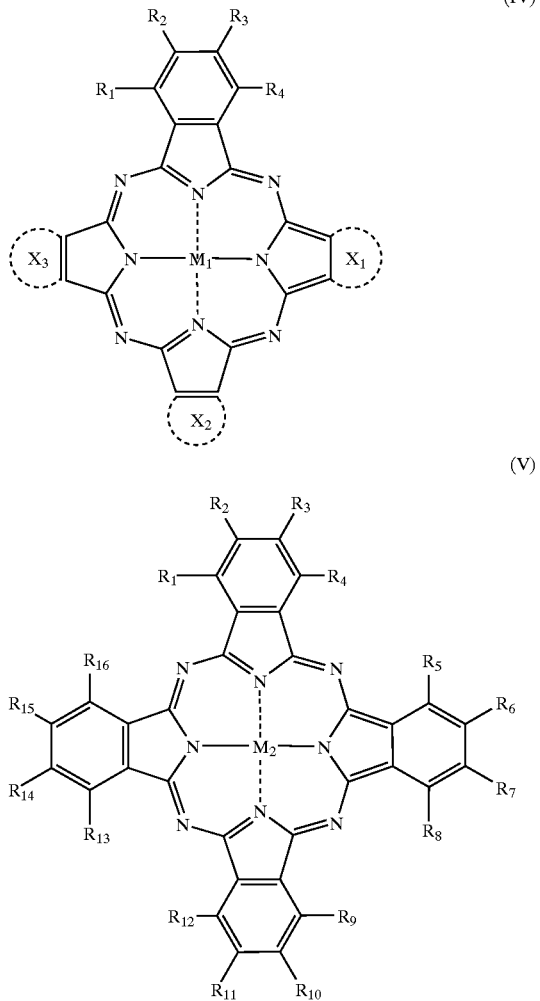

wherein $X_1$, $X_2$ and $X_3$ are each a benzene ring, a pyrazine ring, or a naphthalene ring to which a halogen atom, a nitro group, an alkyl group, or an alkoxy group may be bonded, provided that at least one of $X_1$, $X_2$ and $X_3$ is a naphthalene ring;

$R_1$ to $R_{16}$ are each a hydrogen atom, a halogen atom, a nitro group, an alkyl group or an alkoxy group; and $M_1$ and $M_2$ are each an atom selected from hydrogen ($H_2$), Cu or Al to which chloride is bonded, or $M_1$ and $M_2$ are an atom, to which oxygen, halogen or hydroxyl is bonded, selected from the group consisting of Ti, V, Zr, Ge, Ga, and In.

2. The electrophotographic photoreceptor according to claim 1, wherein the central atom $M_1$ of the phathalocyanine compound is TiO.

3. The electrophotographic photoreceptor according to claim 1, wherein the central atom $M_2$ of the phthalocyanine compound is TiO.

4. The electrophotographic photoreceptor according to claim 1, wherein a main component of the phthalocyanine compound is a metal-free phthalocyanine and the composition crystal has X type crystal form.

5. The electrophotographic receptor according to claim 1, wherein a main component of the phthalocyanine compound is titanyl phthalocyanine and the composition crystal has a highest peak at a Bragg diffraction angle (2θ) of 27.3 degree in powder X ray diffraction spectrum.

6. The electrophotographic photoreceptor according to claim 1, wherein the ratio of said asymmetric phthalocyanine compound represented by the general formula (IV) to said phthalocyanine-based compound represented by general formula (V) is from about 0.01 weight parts to about 50 weight parts of said asymmetric phthalocyanine compound represented by general formula (IV) per 100 weight parts of said phthalocyanine-based compound represented by general formula (V).

* * * * *

UNITED STATES PATENT AND TRADEMARK OFFICE
CERTIFICATE OF CORRECTION

PATENT NO. : 6,858,364 B2
DATED : February 22, 2005
INVENTOR(S) : Shinichi Tamura It is certified that error appears in the above-identified patent and that said Letters Patent is hereby corrected as shown below:

<u>Column 24,</u>
Lines 66-67, "containing a composition comprising" should read -- comprising a compostion crystal comprising --

<u>Column 25,</u>
Line 2, "phathalocyanine" should read -- phthalocyanine --
Line 2, "represented y the" should read -- represented by the --

Signed and Sealed this

Twenty-eighth Day of June, 2005

JON W. DUDAS
*Director of the United States Patent and Trademark Office*